United States Patent Office 3,469,936
Patented Sept. 30, 1969

3,469,936
BROMINE PENTAFLUORIDE DISPOSAL
Albert A. Chilenskas and John E. Kincinas, Chicago, Ill., assignors to the United States of America as represented by the United States Atomic Energy Commission
No Drawing. Filed Dec. 13, 1967, Ser. No. 690,109
Int. Cl. C01f 7/50
U.S. Cl. 23—88                     8 Claims

ABSTRACT OF THE DISCLOSURE

Bromine pentafluoride is passed through a bed of activated alumina to form solid aluminum fluoride and bromine gas. The bromine gas is then passed through a bed of soda lime which reacts with the bromine to complete the disposal of bromine pentafluoride.

Contractural origin of the invention

The invention described herein was made in the course of, or under, a contract with the United States Atomic Energy Commission.

Background of the invention

This invention relates to a process for the disposal of bromine pentafluoride and more particularly to a process in which bromine pentafluoride is successively reacted with activated alumina and soda lime, or its equivalent.

Bromine pentafluoride is conveniently used in the recovery of uranium and plutonium from spent nuclear fuel elements because it fluorinates uranium to the volatile hexafluoride but plutonium to the nonvolatile tetrafluoride. When the spent nuclear fuel has been fluorinated with bromine pentafluoride, the off-gas from that fluorination contains uranium hexafluoride, various volatile fission product fluorides, bromine pentafluoride and a diluent gas, usually nitrogen. The off-gas from the bromine pentafluoride fluorination is treated to remove as much of the uranium and fission product fluorides as is economically possible before it is treated as a waste gas.

An ideal disposal system for bromine pentafluoride should be efficient, have a large capacity and be uncomplicated and reliable in order to prevent excessive down time for repairs and the like. Capacity of a disposal system is herein defined as the amount of bromine pentafluoride removed by the system divided by the amount of reagent used for the removal, and efficiency is herein defined as the amount of bromine pentafluoride retained by the system divided by the amount of bromine pentafluoride fed to the system. Problems encountered in some disposal systems are caking of the reagents which cuts down on both capacity and efficiency, corrosion of the process equipment because of the caustic nature of the chemical constituents and incomplete removal of bromine.

The process of this invention comprises the reaction of bromine pentafluoride with activated alumina particles to produce a bromine containing gas followed by reaction of the bromine gas with the oxides or hydroxides of the alkali metals, the alkali earth metals or mixtures thereof to remove the bromine. The advantages of this system are its high capacity and efficiency as well as its inherent removal of any volatile uranium hexafluoride present with the bromine pentafluoride.

A clear distinction must be drawn between dense alumina normally used as bed support material in a fluidized bed and activated alumina. Dense alumina will not react with bromine pentafluoride and is inoperable for this invention. The activated alumina which is an essential part of this process is aluminum oxide in porous amorphous form with minor amounts of hydrated alumina and small amounts of soda and oxides of iron, silicon and titanium. Some of the soda is combined with the silica and alumina as insoluble constituents. The composition of activated alumina follows, and processes for making the same are contained in U.S. Patents Nos. 1,868,869 and 2,015,593:

| | Percent |
|---|---|
| Alumina ($Al_2O_3$) | 92.00 |
| Loss on Ignition | 7.00 |
| Soda ($Na_2O$) | <0.80 |
| Silica ($SiO_2$) | <0.10 |
| Ferric Oxide ($Fe_2O_3$) | <0.10 |
| Titania ($TiO_2$) | <0.02 |

When bromine pentafluoride contacts alumina, the following reaction takes place:

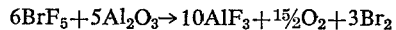

If any uranium hexafluoride is present, it also reacts with the activated alumina according to the following equation:

It is clear therefore that the activated alumina removes the fluorine from the bromine pentafluoride as well as all of the uranium hexafluoride. The off-gas from the activated alumina reaction consists of steam, derived from any water in the activated alumina or the soda lime, oxygen and bromine gas. This off-gas is reacted with soda lime or its equivalent.

Soda lime, a combination of sodium hydroxide and calcium oxide, is a comparatively inexpensive reagent. Since soda lime is easy to obtain, it was used exclusively in the process, but other combinations of the oxides or hydroxides of the alkali metals or alkali earth metals may be substituted. The principal requirement is that the bromine is removed from the gas by combining with the reagent.

Since the principal advantages of this invention are its high capacity and efficiency, the activated alumina and the soda lime should be maintained in particulate form. Sintering of the activated alumina particles drastically reduces the surface area available for reaction with the bromine pentafluoride, thereby decreasing the system efficiency and capacity. Since activated alumina sinters at temperatures in excess of 1000° C. and the reaction between alumina and bromine pentafluoride is highly exothermic, care must be taken not to allow the alumina to exceed that temperature. One method of controlling the activated alumina-bromine pentafluoride reaction temperature is to transfer the heat of the exothermic reaction from the reaction situs. Heat transfer is made easier if the activated alumina particles are present in the form of a fluidized bed, particularly in the case where the reactants are present in large quantities. The temperature and heat removal considerations applicable to the activated alumina particles also apply to the soda lime.

Soda lime melts over a wide range depending upon the ratio of calcium oxide to sodium hydroxide, and the reaction temperature of soda lime and bromine should be maintained below this value. If the reaction temperature is such to cause the soda lime to melt, the reduced surface area and its concomitant effect result in the escape of bromine from the system.

The advantages of this invention are conveniently attained by passing a feed gas containing bromine pentafluoride into one or more fluidized beds of activated alumina. The number of beds is determined by the amount of bromine pentafluoride to be reacted, its flow rate and other factors which affect process efficiency and capacity. The off-gas from the last activated alumina bed is fed to one or more fluidized beds of soda lime.

The process of this invention is particularly advantageous in the disposal of bromine pentafluoride used for plutonium or uranium reclamation. Proper temperature control, as illustrated above, not only prevents sintering or melting of the bed material but also corrosion of the equipment. The beds which may become radioactive can be dumped and replaced by remote control without the need for extensive down time due to caking. Corrosion is prevented by operating the beds at a minimum temperature of about 150° C. Any water present from the bed materials will be maintained as steam and pass out of the reactor vessel with the off-gas. In addition, corrosive hydrobromic acid will not form with steam but probably would form if water were allowed to collect in the reactor.

The following two experiments are representative of the many which have been performed using the process of this invention. Packed beds instead of fluidized beds were used because the small quantity of reactants did not require fluidization for heat removal purposes.

A packed bed of activated alumina 8 to 14 mesh and a packed bed of soda lime 4 to 8 mesh were contained in a two-inch internal diameter pipe. A process gas of 10 volume percent bromine pentafluoride in nitrogen was admitted to the activated alumina bed at a rate of 4 liters per minute. The off-gas from the activated alumina bed was passed through the soda lime. The off-gas from the soda lime was passed through a potassium iodide solution which was titrated with sodium thiosulfate using tyyodene as an indicator. When the potassium iodide solution changed color indicating that bromine gas had broken through the soda lime, the flow of process gas was terminated. The potassium iodide solution was examined for bromine content to determine how much bromine passed through the disposal system in order to calculate the system efficiency.

The table below shows data for two of the runs conducted using the process of this invention. Although the activated alumina bed reached temperatures of about 550° C. during the run, the temperatures reported in the table are the initial bed temperatures.

TABLE

| Activated alumina | | Soda lime | | | |
|---|---|---|---|---|---|
| Weight, g. | Temp., °C. | Weight, g. | Temp., °C. | Efficiency, percent | Capacity |
| 300 | Room | 1,000 | 271–355 | 99.993 | .30 |
| 600 | 150 | 1,000 | 305–334 | 99.998 | .38 |

In both of the above runs, as well as in others not reported here, the beds were found to be essentially odor-free, free-flowing and easily discharged. In particular, no bromine gas evolved from the soda lime when that bed was cooled. Bromine evolution had been a problem prior to operation of the soda lime bed at the temperatures indicated in the table.

The temperature of the bed of sodium hydroxide and calcium oxide can be maintained between about 150° C. and about 400° C., e.g., at about 350° C. A suitable temperature range of the activated alumina of between about 500° C. and about 600° C. can be maintained.

It will be understood that the invention is not to be limited to the details given herein but that it may be modified within the scope of the appended claims.

The embodiments of the invention in which an exclusive property or privilege is claimed are defined as follows:

1. A process for the disposal of bromine pentafluoride comprising: introducing bromine pentafluoride gas into a bed of activated alumina particles, whereby a bromine containing off-gas and solid aluminum fluoride are produced and passing the bromine off-gas through a bed of oxides or hydroxides of the alkali metals, the alkali earth metals or mixtures thereof.

2. The process of claim 1 wherein the bed is maintained at a temperature below the sintering or melting temperature of the bed.

3. The process of claim 2 wherein the bromine containing off-gas is passed through a bed of the oxides or hydroxides of sodium, potassium, calcium and mixtures thereof.

4. The process of claim 3 wherein the bed is fluidized.

5. The process of claim 4 wherein the activated alumina bed is maintained at a temperature from about 150° C. to about 1000° C.

6. The process of claim 5 wherein the bromine containing off-gas is passed through a bed of sodium hydroxide and calcium oxide.

7. The process of claim 6 wherein the bed of sodium hydroxide and calcium oxide is maintained at a temperature between about 150° C. and about 400° C.

8. The process of claim 7 wherein the bed of sodium hydroxide and calcium oxide is maintained at about 350° C. and the bed of activated alumina is maintained between about 500° C. and 600° C.

References Cited

UNITED STATES PATENTS

| 2,670,276 | 2/1954 | Bloch et al. | 23—216 |
| 2,784,063 | 3/1957 | Block et al. | 23—216 XR |

FOREIGN PATENTS 131,750  9/1919  Great Britain.

OTHER REFERENCES

"The Chemistry of Fluorine and Its Inorganic Compounds," by I. G. Ryss, Part I, AEC–tr–3927, page 144. State Publishing House for Scientific, Technical and Chemical Literature, Moscow, 1956. Copy printed U.S.A., issuance date: February 1960.

EDWARD STERN, Primary Examiner

U.S. Cl. X.R.

23—86, 216, 221, 354